US012641168B2

(12) United States Patent
Pan et al.

(10) Patent No.: US 12,641,168 B2
(45) Date of Patent: May 26, 2026

(54) INTERACTIVE CONTROL DEVICE

(71) Applicant: Primax Electronics Ltd., Taipei (TW)

(72) Inventors: Yung-Tai Pan, Taipei (TW);
Wen-Hsien Chan, Taipei (TW);
Rong-Fu Lee, Taipei (TW); I-Min Shu,
Taipei (TW); Wei-Ching Kuo, Taipei
(TW); Bo-An Chen, Taipei (TW)

(73) Assignee: Primax Electronics Ltd., Taipei (TW)

( * ) Notice: Subject to any disclaimer, the term of this
patent is extended or adjusted under 35
U.S.C. 154(b) by 286 days.

(21) Appl. No.: 18/537,499

(22) Filed: Dec. 12, 2023

(65) Prior Publication Data

US 2024/0388649 A1      Nov. 21, 2024

Related U.S. Application Data

(60) Provisional application No. 63/466,557, filed on May
15, 2023.

(51) Int. Cl.
H04M 1/02 (2006.01)
G06F 3/041 (2006.01)

(52) U.S. Cl.
CPC .......... H04M 1/026 (2013.01); G06F 3/0412
(2013.01)

(58) Field of Classification Search
CPC ... H04M 1/026; G06F 3/0412; G06F 3/04886
See application file for complete search history.

(56) References Cited

U.S. PATENT DOCUMENTS

| | | | | |
|---|---|---|---|---|
| 5,768,370 A * | 6/1998 | Maatta | ................ | H04M 1/0283 379/434 |
| 6,667,738 B2 * | 12/2003 | Murphy | ................ | G06F 1/1626 345/173 |
| 6,763,995 B1 * | 7/2004 | Song | .................... | G06F 3/0238 235/487 |
| 6,898,283 B2 * | 5/2005 | Wycherley | .......... | H04M 1/7246 455/575.8 |
| 6,920,338 B2 * | 7/2005 | Engstrom | ........... | H04M 1/0202 455/575.1 |
| 6,975,888 B2 * | 12/2005 | Buesseler | ........... | H04M 1/7246 455/575.1 |
| 6,999,804 B2 * | 2/2006 | Engstrom | .............. | H01Q 1/245 455/575.8 |
| 7,050,764 B2 * | 5/2006 | Carlson | ............... | H04M 1/0283 455/90.3 |
| 7,079,864 B2 * | 7/2006 | Engstrom | ........... | H04M 1/0283 455/90.3 |
| 7,149,559 B2 * | 12/2006 | Qin | ...................... | H04B 1/3833 455/575.8 |
| 8,634,873 B2 * | 1/2014 | Jones | .................. | H04M 1/0247 455/66.1 |

(Continued)

*Primary Examiner* — Lewis G West

(74) *Attorney, Agent, or Firm* — KIRTON McCONKIE;
Evan R. Witt

(57) ABSTRACT

An interactive control device includes a housing, a touch
display panel and a face cover. The touch display panel is
disposed within the housing. The face cover has a front
surface and a rear surface. A first hollow configuration is
formed on the front surface of the face cover, the face cover
is detachably assembly with the housing and placed over the
touch display panel, and a display area and a touch area of
the touch display panel are limited by the first hollow
configuration.

6 Claims, 11 Drawing Sheets

(56)　　　　　References Cited

U.S. PATENT DOCUMENTS

| | | | | |
|---|---|---|---|---|
| 8,965,466 | B2 * | 2/2015 | Oh | H04M 1/04 |
| | | | | 455/575.8 |
| 9,118,750 | B2 * | 8/2015 | Vossoughi | H04M 1/0254 |
| 9,521,221 | B2 * | 12/2016 | Huang | H04B 1/3888 |
| 2003/0017839 | A1 * | 1/2003 | Mager | H04M 1/0283 |
| | | | | 455/550.1 |
| 2003/0134613 | A1 * | 7/2003 | Latto | G03B 17/56 |
| | | | | 455/347 |
| 2004/0198247 | A1 * | 10/2004 | Jokinen | H04M 1/0283 |
| | | | | 455/90.1 |
| 2006/0256090 | A1 * | 11/2006 | Huppi | A63F 13/92 |
| | | | | 345/173 |
| 2010/0328052 | A1 * | 12/2010 | Pasquero | G06F 3/04886 |
| | | | | 345/173 |
| 2011/0109594 | A1 * | 5/2011 | Marcus | G06F 3/0393 |
| | | | | 345/173 |
| 2013/0181935 | A1 * | 7/2013 | Mckenzie | G06F 3/0445 |
| | | | | 345/174 |
| 2013/0242416 | A1 * | 9/2013 | Feola | H04M 1/22 |
| | | | | 359/801 |
| 2013/0307780 | A1 * | 11/2013 | Todora | G06F 3/0202 |
| | | | | 345/168 |
| 2015/0065202 | A1 * | 3/2015 | Lee | H04M 1/185 |
| | | | | 455/575.8 |
| 2015/0105128 | A1 * | 4/2015 | Huang | G06F 3/0444 |
| | | | | 455/575.8 |
| 2015/0338954 | A1 * | 11/2015 | Yang | G06F 3/04186 |
| | | | | 345/174 |
| 2021/0132787 | A1 * | 5/2021 | Jung | B60K 35/81 |
| 2025/0093973 | A1 * | 3/2025 | Seger, Jr. | G06F 3/0418 |

* cited by examiner

INTERACTIVE CONTROL DEVICE

CROSS-REFERENCE TO RELATED APPLICATION

This application claims priority to U.S. Provisional Patent Application No. 63/466,557 filed May 15, 2023, the contents of which are incorporated herein by reference.

FIELD OF THE INVENTION

The present invention relates to an interactive control device, and more particularly to an interactive control device with a replaceable face cover.

BACKGROUND OF THE INVENTION

Nowadays, interactive control devices are introduced into the market. For example, the interactive control devices include live streaming controllers, audio-visual streaming controllers or image editing controllers. The layout structures of the hardware operating interfaces (e.g., buttons, knobs or display panels) of the interactive control devices are usually fixed and unchanged. Consequently, the flexibility and expandability of the layout structures of the hardware operating interfaces are not satisfied. In other words, the existing interactive control device needs to be further improved.

SUMMARY OF THE INVENTION

In order to overcome the drawbacks of the conventional technologies, the present invention provides an interactive control device. The interactive control device is equipped with a mechanism of replacing a face cover. When the original face cover is replaced with a new face cover, a corresponding screen is displayed on a touch display panel of the interactive control device. In the interactive control device of the present invention, the face cover is replaced according to the application programs, the operating actions or the user's dominant hand. Since the use flexibility of the interactive control device is enhanced, the interactive control device can meet the personal needs.

In accordance with an aspect of the present invention, an interactive control device is provided. The interactive control device includes a housing, a touch display panel and a face cover. The touch display panel is disposed within the housing. The face cover has a front surface and a rear surface. A first hollow configuration is formed on the front surface of the face cover, the face cover is detachable assembly with the housing and placed over the touch display panel, and a display area and a touch area of the touch display panel are limited by the first hollow configuration.

In an embodiment, the face cover includes plural hollow parts, and the plural hollow parts are arranged in the first hollow configuration. The plural hollow parts are classified into at least two types of hollow parts with different sizes or shapes.

In an embodiment, the face cover and the housing are assembled with each other through a magnetic attraction mechanism.

In an embodiment, the housing includes a recessed structure. When the face cover is placed over the touch display panel and the rear surface of the face cover faces the touch display panel, a portion of the rear surface of the face cover is exposed through the recessed structure.

In an embodiment, the interactive control device further includes an optical sensing module. The optical sensing module is disposed within the housing. The optical sensing module includes a transmitter portion and a receiver portion.

In an embodiment, the face cover includes a light reflection structure. The light reflection structure is formed on the rear surface of the first face cover and faces the optical sensing module. A light beam emitted from the transmitter portion is reflected by the light reflection structure and transmitted to the receiver portion.

In an embodiment, after the face cover is rotated by 180 degrees, a second hollow configuration is formed on the front surface of the face cover, and then the face cover is placed over the touch display panel. The light reflection structure does not face the optical sensing module. Consequently, a reduced portion of the light beam emitted from the transmitter portion or none of the light beam emitted from the transmitter portion is transmitted to the receiver portion.

In an embodiment, after the face cover is flipped by 180 degrees, a second hollow configuration is formed on the rear surface of the face cover, and then the face cover is placed over the touch display panel. The light reflection structure does not face the optical sensing module. Consequently, a reduced portion of the light beam emitted from the transmitter portion or none of the light beam emitted from the transmitter portion is transmitted to the receiver portion.

In an embodiment, the interactive control device further includes a magnetic sensor and at least one magnet. The magnetic sensor and the at least one magnet are aligned with each other in a vertical direction. The magnetic sensor is disposed within the housing, and the magnet is installed on the face cover.

In an embodiment, after the face cover is rotated by 180 degrees, a second hollow configuration is formed on the front surface of the face cover, and then the face cover is placed over the touch display panel. The magnetic sensor and the at least one magnet are not aligned with each other in the vertical direction. The interactive control device recognizes that the face cover has been rotated.

In an embodiment, after the face cover is flipped by 180 degrees, a second hollow configuration is formed on the rear surface of the face cover, and then the face cover is placed over the touch display panel. The magnetic sensor and the at least one magnet are not aligned with each other in the vertical direction. The interactive control device recognizes that the face cover has been rotated.

In accordance with another aspect of the present invention, an interactive control device is provided. The interactive control device includes a housing, a touch display panel, a first face cover and a second face cover. The touch display panel is disposed within the housing. The first face cover has a first hollow configuration. When the first face cover is placed over the touch display panel, a first screen is displayed on the touch display panel, and the first screen is exposed through the first hollow configuration. The second face cover has a second hollow configuration, which is different from the first hollow configuration. When the second face cover is placed over the touch display panel, a second screen is displayed on the touch display panel, and the second screen is exposed through the second hollow configuration.

In an embodiment, the first face cover includes plural hollow parts, and the plural hollow parts are arranged in forming the first hollow configuration. The first screen includes plural sub-screens. In addition, the shapes and sizes of the plural sub-screens of the first screen match the shapes and sizes of the plural hollow parts of the first face cover.

The second face cover includes plural hollow parts, and the plural hollow parts are arranged in forming the second hollow configuration. The second screen includes plural sub-screens. In addition, the shapes and sizes of the plural sub-screens of the second screen match the shapes and sizes of the plural hollow parts of the second face cover.

In an embodiment, the interactive control device further includes a memory. A first boundary information about the first hollow configuration and a second boundary information about the second hollow configuration are stored in the memory. The touch display panel outputs the first screen according to the first boundary information. The touch display panel outputs the second screen according to the second boundary information.

In an embodiment, the interactive control device further includes a sensing element, and the sensing element recognizes the first face cover or the second face cover.

In an embodiment, the sensing element includes an optical sensing module. The optical sensing module is disposed within the housing, and the optical sensing module includes a transmitter portion and a receiver portion.

In an embodiment, the first face cover has a front surface and a rear surface, and the second face cover has a front surface and a rear surface. A light reflection structure is formed on the rear surface of the first face cover or the rear surface of the second face cover and faces the optical sensing module. A light beam from the transmitter portion is reflected by the light reflection structure and transmitted to the receiver portion.

In an embodiment, the sensing element includes a magnetic sensor, and the magnetic sensor is disposed within the housing. A magnet is installed on the first face cover or the second face cover. The magnetic sensor and the magnet are aligned with each other in a vertical direction.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

The present invention provides an interactive control device. For example, the interactive control device is a live streaming controller, an audio-visual streaming controller, an image editing controller, a peripheral device controller or a shortcut key controller.

Figure 1:
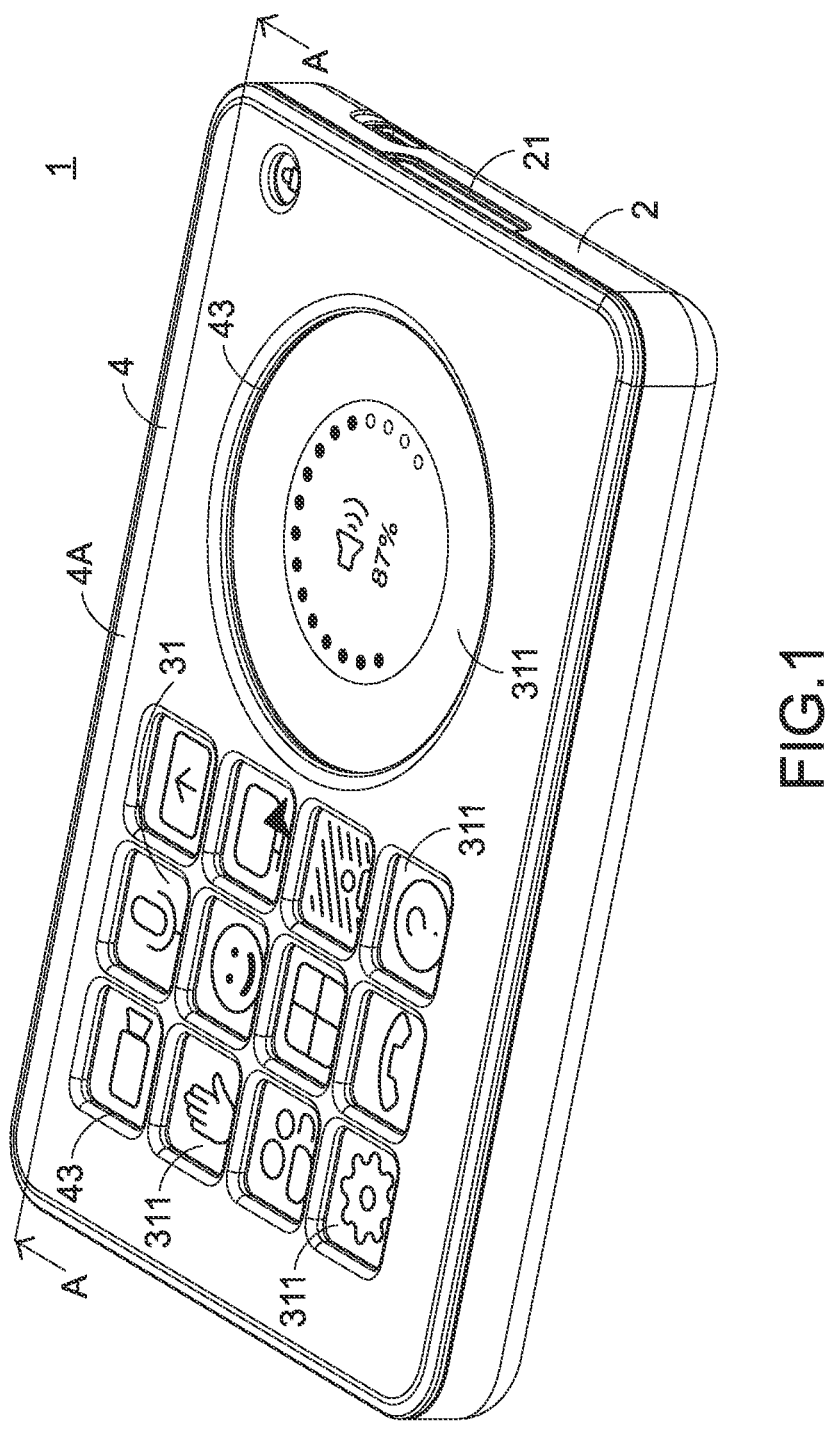
FIG. 1 is a schematic perspective view illustrating an interactive control device according to a first embodiment of the present invention.
Figure 2:
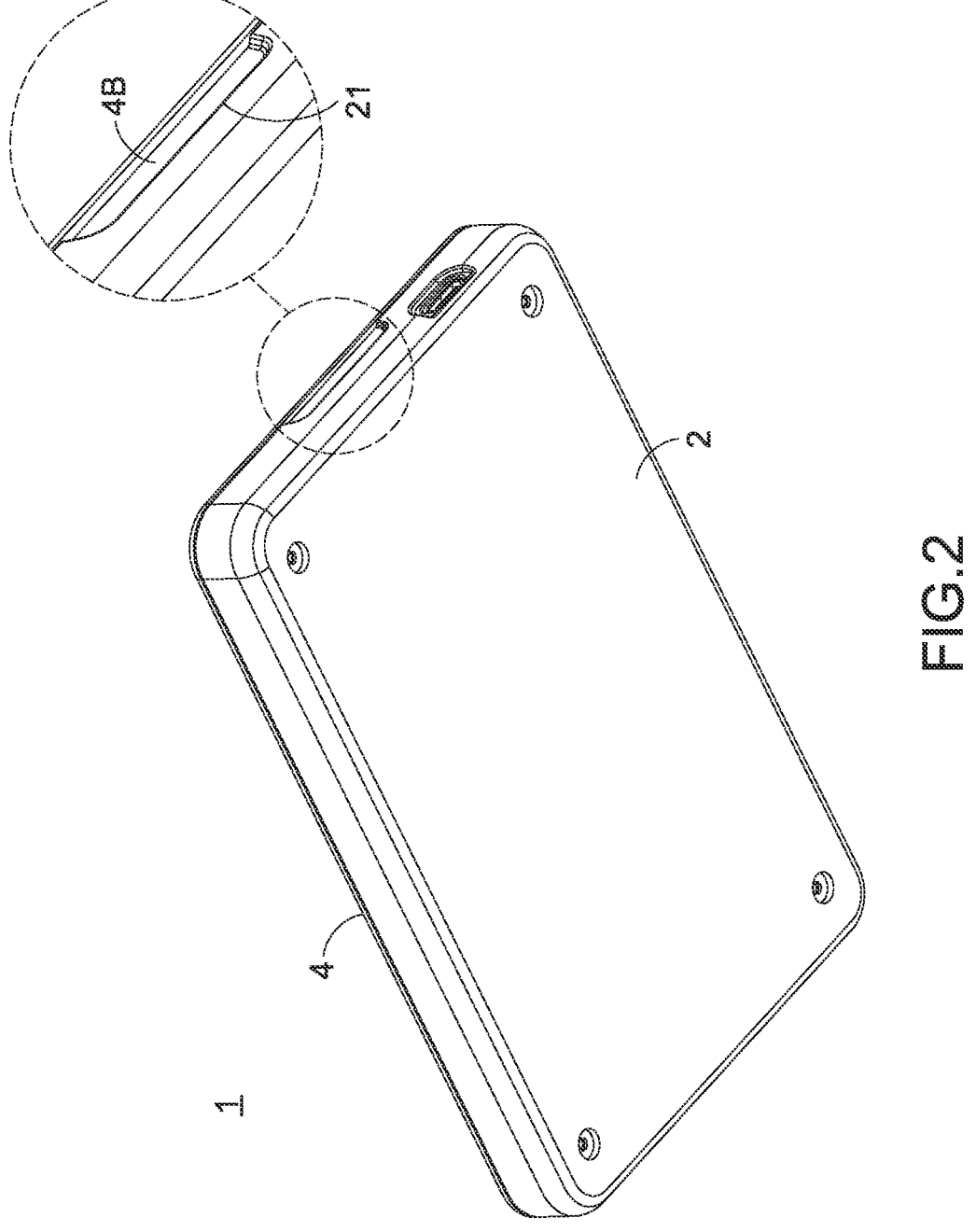
FIG. 2 is a schematic perspective view illustrating the interactive control device of FIG. 1 and taken along another viewpoint.
Figure 3:
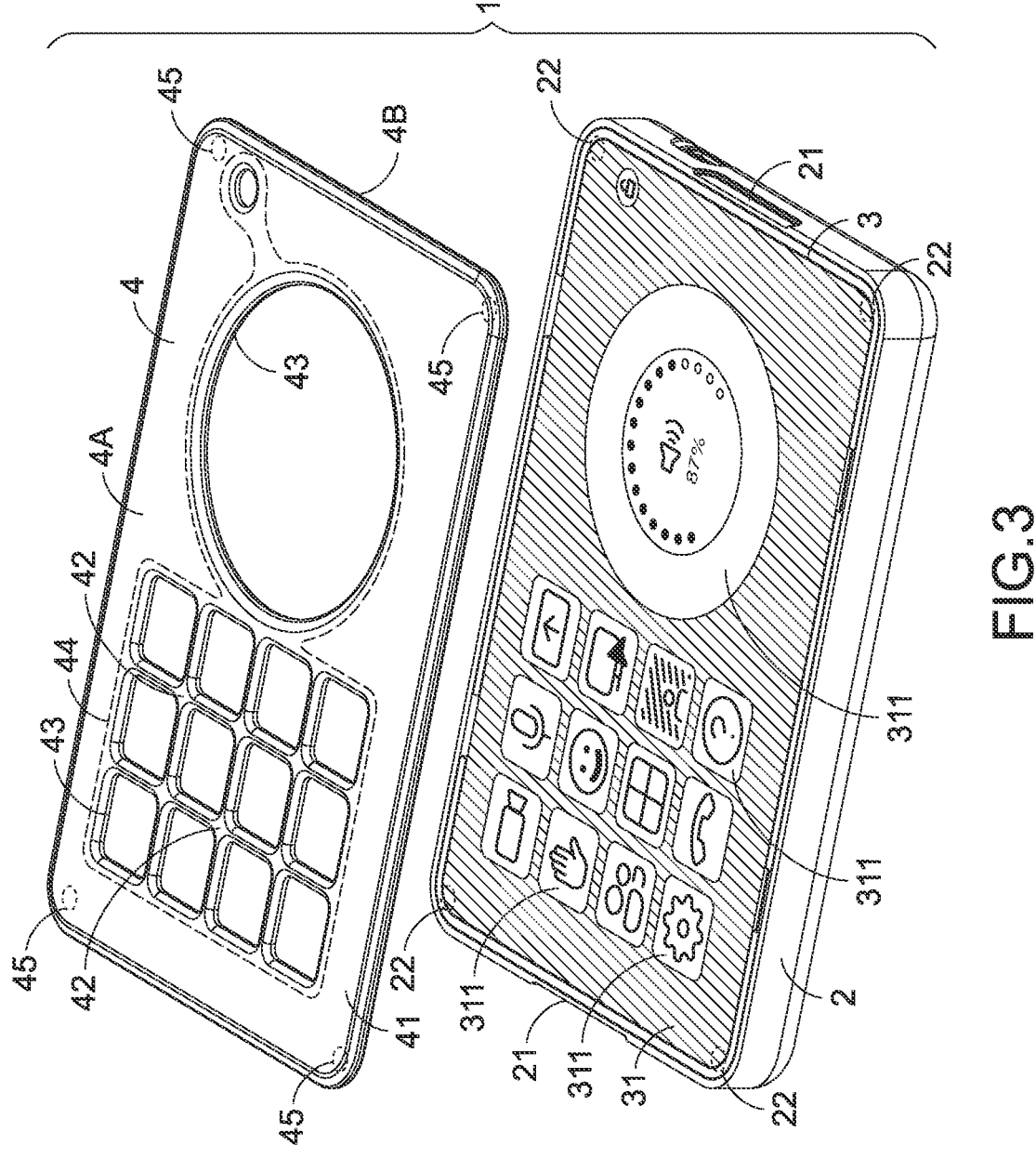
FIG. 3 is a schematic perspective and exploded view illustrating the interactive control device of FIG. 1.
Figure 4:
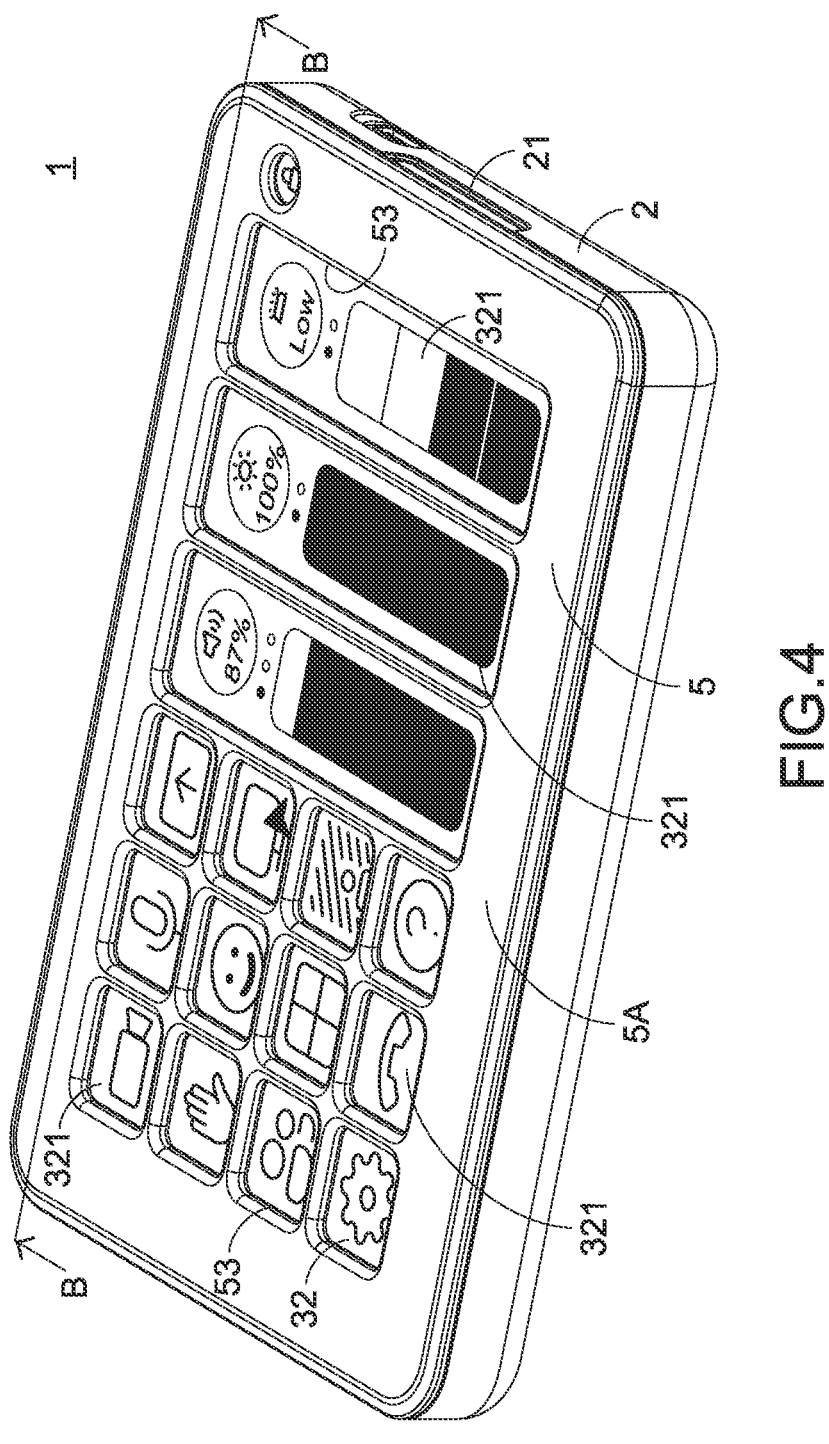
FIG. 4 is a schematic perspective view illustrating the interactive control device of FIG. 1, in which the original face cover is replaced with another face cover.
Figure 5:
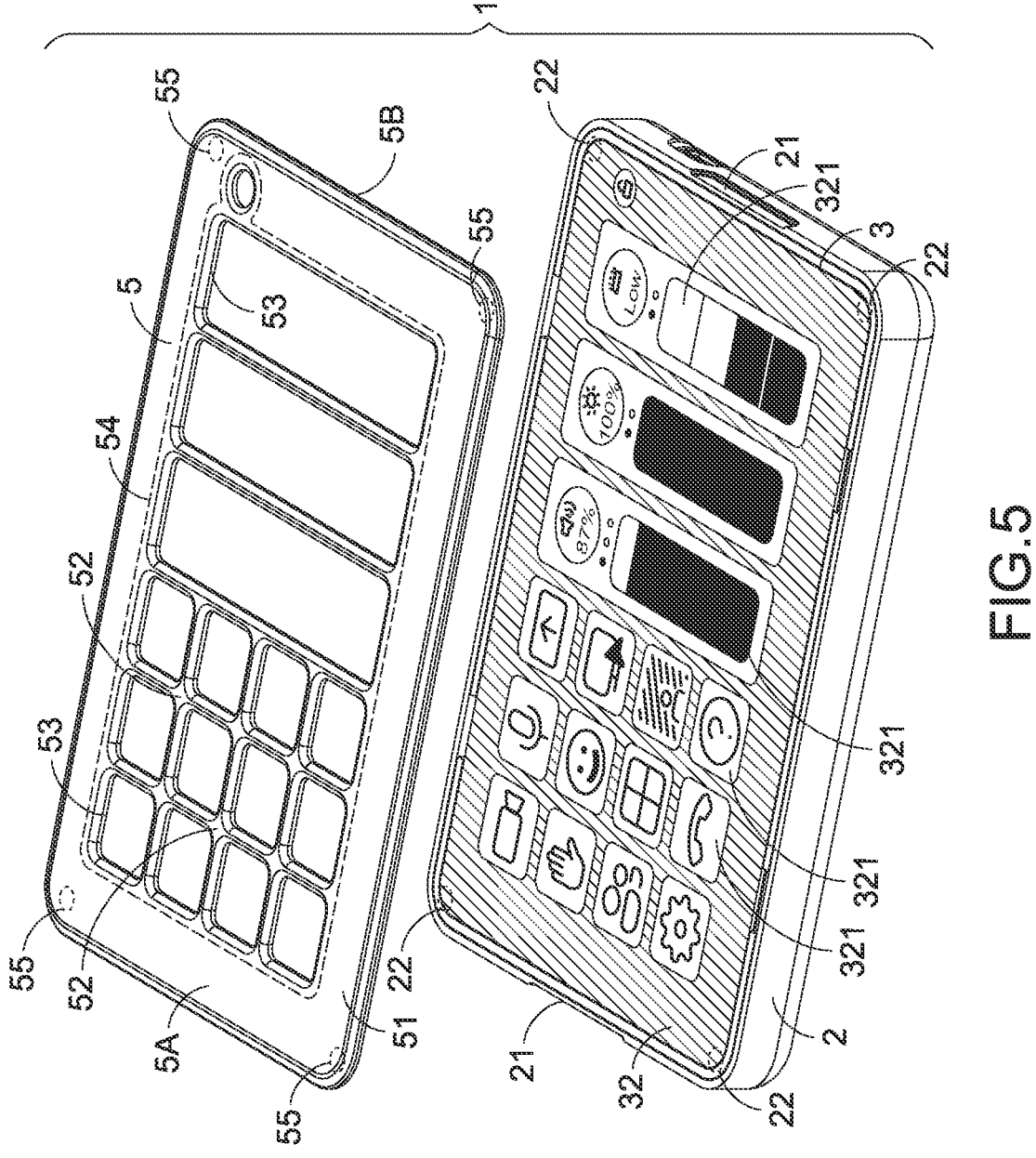
FIG. 5 is a schematic perspective and exploded view illustrating the interactive control device of FIG. 4.
Figures 6, 7:
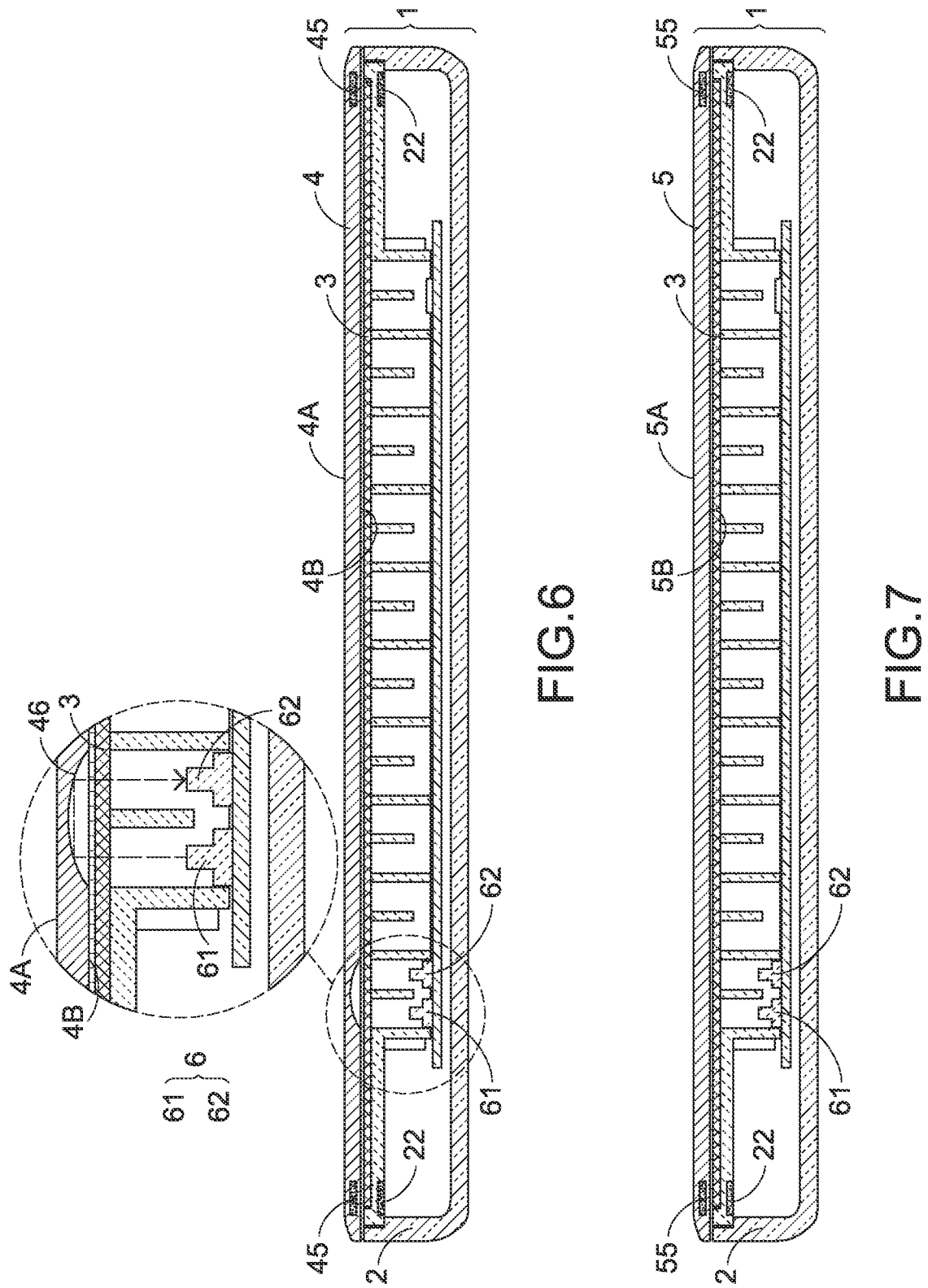
FIG. 6 is a schematic cross-sectional view illustrating the interactive control device of FIG. 1 and taken along the line A-A.
FIG. 7 is a schematic cross-sectional view illustrating the interactive control device of FIG. 4 and taken along the line B-B.

A first embodiment of an interactive control device will be described with reference to FIGS. 1 to 7. FIG. 1 is a schematic perspective view illustrating an interactive control device according to a first embodiment of the present invention. FIG. 2 is a schematic perspective view illustrating the interactive control device of FIG. 1 and taken along another viewpoint. FIG. 3 is a schematic perspective and exploded view illustrating the interactive control device of FIG. 1. FIG. 4 is a schematic perspective view illustrating the interactive control device of FIG. 1, in which the original face cover is replaced with another face cover. FIG. 5 is a schematic perspective and exploded view illustrating the interactive control device of FIG. 4. FIG. 6 is a schematic cross-sectional view illustrating the interactive control device of FIG. 1 and taken along the line A-A. FIG. 7 is a schematic cross-sectional view illustrating the interactive control device of FIG. 4 and taken along the line B-B. In this embodiment, the interactive control device 1 comprises a housing 2, a touch display panel 3, a first face cover 4 and a second face cover 5.

The touch display panel 3 is disposed within the housing 2. The display panel of the touch display panel 3 is a liquid-crystal display (LCD) panel (e.g., a TFT panel, an IPS panel or a super LCD panel) or an organic light-emitting diode (OLED) panel. Alternatively, the display panel of the touch display panel 3 is an electronic panel such as an electrophoretic display (EPD) panel or a cholesteric liquid crystal display (ChLCD) panel. The touch mechanism for the touch display panel 3 is a capacitive touch mechanism, a resistive touch mechanism, an infrared touch mechanism, an ultrasonic touch mechanism, an electromagnetic touch mechanism or an image sensing touch mechanism. In addition, the touch mechanism and the display panel are combined together in an external mount manner or an embedded manner.

In the interactive control device 1 of the present embodiment, both of the first face cover 4 and the second face cover 5 are detachable. That is, one of the first face cover 4 and the second face cover 5 can be assembled with the housing 2 in a non-permanently fixed manner to cover the top side of the touch display panel 3, or the first face cover 4 or the second face cover 5 can be detached from the housing 2. Consequently, when the user changes the need or purpose of use, or the user wants to change the dominant hand used, or even the interactive control device is operated by another user, the first face cover 4 originally assembled with the housing 2 can be replaced with the second face cover 5, or the second face cover 5 originally assembled with the housing 2 can be replaced with the first face cover 4. In the above embodiment, only the first face cover 4 and the second face cover 5 are employed to describe the concepts of the present invention. It is noted that the number of the face covers is not restricted. For example, in some other embodiments, more replaceable face covers matching the underlying control display panel 3 to achieve the purpose of the present invention.

The first face cover 4 comprises an outer frame 41, an inner frame 42 and plural hollow parts 43. The outer frame 41 is arranged around the inner frame 42 and the plural hollow parts 43. The adjacent hollow parts 43 are separated from each other by the inner frame 42. In other words, the outer frame 41, the inner frame 42 and the plural hollow parts 43 form an undulating grid-like structure. Consequently, when the user's finger touches the first face cover 4, the user's finger can perform different types of operations (e.g., tapping, pressing, sliding or rotating operations) on the correct positions or areas according to the tactile feedback and the hand feel memory. In addition, the material of the first face cover 4 is made of plastic or metallic material.

The first face cover 4 has a front surface 4A and a rear surface 4B. When the user faces the front surface 4A, i.e., the first face cover 4 is viewed from the user's perspective, the plural hollow parts 43 formed in the front surface 4A are arranged in forming a first hollow configuration 44. When the first face cover 4 is detachably assembled with the housing 2 and placed on the touch display panel 3, the display area and the touch area of the touch display panel 3 are limited by the first hollow configuration 44 of the first face cover 4. In an embodiment, the sizes and shapes of the plural hollow parts 43 of the first face cover 4 are identical. In another embodiment, the first face cover 4 comprises at least two types of hollow parts 43 with different sizes or shapes.

The second face cover 5 comprises an outer frame 51, an inner frame 52 and plural hollow parts 53. The outer frame 51 is arranged around the inner frame 52 and the plural hollow parts 53. The adjacent hollow parts 53 are separated from each other by the inner frame 52. In other words, the outer frame 51, the inner frame 52 and the plural hollow parts 53 form an undulating grid-like structure. Consequently, when the user's finger touches the second face cover 5, the user's finger can perform different types of operations (e.g., tapping, pressing, sliding or rotating operations) on the correct positions or areas according to the tactile feedback and the hand feel memory. In addition, the material of the second face cover 5 is made of plastic or metallic material.

The second face cover 5 has a front surface 5A and a rear surface 5B. When the user faces the front surface 5A, i.e., the second face cover 5 is viewed from the user's perspective, the plural hollow parts 53 formed in the front surface 5A are arranged in forming a second hollow configuration 54. The second hollow configuration 54 is different from the first hollow configuration 44. When the second face cover 5 is detachably assembled with the housing 2 and placed on the touch display panel 3, the display area and the touch area of the touch display panel 3 are limited by the second hollow configuration 54 of the second face cover 5. In an embodiment, the sizes and shapes of the plural hollow parts 53 of the second face cover 5 are identical. In another embodiment, the second face cover 5 comprises at least two types of hollow parts 53 with different sizes or shapes.

For facilitating the user to replace the face cover, the interactive control device 1 further comprises a recessed structure 21. The recessed structure 21 is formed in a lateral wall of the housing 2 for facilitating the user to detach the assembled face cover from the housing 2. For example, as shown in FIG. 2, the first face cover 4 is placed on the housing 2, and the rear surface 4B of the first face cover 4 faces the touch display panel 3. Under this circumstance, a portion of the rear surface 4B of the first face cover 4 is exposed through the recessed structure 21 of the housing 2. In case that the user intends to remove the first face cover 4 from the housing 2, the user's finger may insert into the recessed structure 21 to touch the rear surface 4B of the first face cover 4. Consequently, the first face cover 4 can be lifted up conveniently. Similarly, when the second face cover 5 is assembled with the housing 2, the second face cover 5 can be smoothly detached from the housing 2 through the recessed structure 21.

In the interactive control device 1, the first face cover 4 and the second face cover 5 are detachably assembled with the housing 2 through a detachable mechanism. The detachable mechanism is a magnetic attraction mechanism, a sliding mechanism, a hook mechanism or a tenon mechanism. In this embodiment, the detachable mechanism is the magnetic attraction mechanism. It is noted that the example of the detachable mechanism is not restricted.

Please refer to FIGS. 3, 5, 6 and 7. In an embodiment, the first face cover 4 comprises at least one magnet 45 (or at least one magnetic element). Correspondingly, the housing 2 comprises at least one magnet 22. The at least one magnet 45 and the corresponding magnet 22 are arranged in a specified position relationship. For example, the at least one magnet 45 and the corresponding magnet 22 are aligned with each other in the vertical direction. Consequently, when the first face cover 4 is assembled with the housing 2, a magnetic attraction force between the at least one magnet 45 and the corresponding magnet 22 is generated. In response to the magnetic attraction force, the first face cover 4 is temporarily fixed on the housing 2, and the alignment between the first face cover 4 and the housing 2 is automatically achieved. Similarly, the second face cover 5 comprises at least one magnet 55 (or at least one magnetic element). When the second face cover 5 is assembled with the housing 2, a magnetic attraction force between the at least one magnet 55 and the corresponding magnet 22 is generated. In response to the magnetic attraction force, the second face cover 5 is temporarily fixed on the housing 2, and the alignment between the second face cover 5 and the housing 2 is automatically achieved.

According to the settings, a control method or a sensing method, the touch display panel 3 can output different screens to correspond to different face covers. For example, when the first face cover 4 is correctly placed on the housing 2 or located over the touch display panel 3, the touch display panel 3 outputs a first screen 31. The first screen 31 is exposed outside through the first hollow configuration 44 so as to be viewed by the user. Similarly, when the second face cover 5 is correctly placed on the housing 2 or located over the touch display panel 3, the touch display panel 3 outputs a second screen 32. The second screen 32 is exposed outside through the second hollow configuration 54 so as to be viewed by the user.

Moreover, the touch display panel 3 has a touch input function. Consequently, when the user's finger touches the first face cover 4 or the second face cover 5, the user's finger can perform different types of operations (e.g., tapping, pressing, sliding or rotating operations) on the correct positions or areas through the first hollow configuration 44 of the first face cover 4 or the second hollow configuration 54 of the second face cover 5. In this way, the interactive efficacy is enhanced.

In an embodiment, the first screen 31 outputted from the touch display panel 3 comprises plural sub-screens 311. Each sub-screen 311 displays an image, an information, an icon or any other appropriate graphic information. In an embodiment, the displayed contents of different sub-screens 311 are different. When the user's finger approaches or touches a specified sub-screen 311, the touch display panel 3 generates a touch signal at the position corresponding to the specified sub-screen 311. Consequently, the interactive control device 1 executes a signal or an instruction corresponding to the specified sub-screen 311. Similarly, the second screen 32 outputted from the touch display panel 3 comprises plural sub-screens 321. Each sub-screen 321 displays an image, an information, an icon or any other appropriate graphic information. In an embodiment, the displayed contents of different sub-screens 321 are different. When the user's finger approaches or touches a specified sub-screen 321, the touch display panel 3 generates a touch signal at the position corresponding to the specified sub-screen 321. Consequently, the interactive control device 1 executes a signal or an instruction corresponding to the specified sub-screen 321.

The shapes and sizes of the plural sub-screens 311 of the first screen 31 match the shapes and sizes of the plural hollow parts 43 of the first face cover 4. For example, the boundaries of the plural sub-screens 311 and the corresponding hollow parts 43 are aligned with each other in the vertical direction. The shapes and sizes of the plural sub-screens 321 of the second screen 32 match the shapes and sizes of the plural hollow parts 53 of the second face cover 5. For example, the boundaries of the plural sub-screens 321 and the corresponding hollow parts 53 are aligned with each other in the vertical direction. With the assistance provided by the physical structure of the first face cover 4 or the second face cover 5, the user can correctly touch the specific sub-screen 321 or 321 and then execute the corresponding instruction. In addition, the risk of accidentally touching other sub-screens 321 or 321 will be minimized.

In an embodiment, the interactive control device 1 further comprises a memory (not shown). A first boundary information about the first hollow configuration 44 and a second boundary information about the second hollow configuration 54 are stored in the memory. In addition, the interactive control device 1 recognizes whether the current face cover over the touch display panel 3 is the first face cover 4 or the second face cover 5. If the current face cover over the touch display panel 3 is the first face cover 4, the touch display panel 3 outputs the first screen 31 according to the first boundary information and outputs the sub-screen 311 at the correct position and area of the first screen 31. Whereas, if the current face cover over the touch display panel 3 is the second face cover 5, the touch display panel 3 outputs the second screen 32 according to the first boundary information and outputs the sub-screen 321 at the correct position and area of the second screen 32.

In an embodiment, the interactive control device 1 recognizes whether the face cover assembled with the housing 2 is the first face cover 4 or the second face cover 5 through the installation of a sensing element (e.g., an optical sensing module or a magnetic sensor), the installation of a triggering switch, a wireless sensing method or an electric connection method. Consequently, the touch display panel 3 outputs the first screen 31 or the second screen 32.

Hereinafter, the installation of a sensing element in the housing 2 to recognize the first face cover 4 or the second face cover 5 will be described. It is noted that the method of recognizing the first face cover 4 or the second face cover 5 is not restricted. Please refer to FIGS. 1, 4, 6 and 7. In an embodiment, the interactive control device 1 further comprises an optical sensing module 6 to recognize the first face cover 4 or the second face cover 5. The optical sensing module 6 is disposed within the housing 2. The optical sensing module 6 comprises a transmitter portion 61 and a receiver portion 62. The transmitter portion 61 emits a light beam. Correspondingly, a light reflection structure 46 is formed on the rear surface 4B of the first face cover 4. The light reflection structure 46 is an arc-shaped reflection structure. The light reflection structure 46 faces the optical sensing module 6. That is, the light reflection structure 46 and the optical sensing module 6 are aligned with each other in the vertical direction. Consequently, when the first face cover 4 is placed on the housing 2, the light beam from the transmitter portion 61 is reflected by the light reflection structure 46 on the rear surface 4B of the first face cover 4 and transmitted to the receiver portion 62. On the contrary, the second face cover 5 is not equipped with the light reflection structure. Alternatively, the second face cover 5 is equipped with a light blocking structure. Due to the light blocking structure, the light beam from the transmitter portion 61 reflected by the light reflection structure 46 is blocked or reduced. Consequently, the light beam cannot be transmitted to the receiver portion 62, or only a small portion of the light beam can be transmitted to the receiver portion 62.

According to the result of judging whether the receiver portion 62 of the optical sensing module 6 receives the light beam or receives a sufficient amount of the light beam, the interactive control device 1 can recognize whether the first face cover 4 or the second face cover 5 is installed on the housing 2. Consequently, the touch display panel 3 is controlled to output the first screen 31 or the second screen 32.

It is noted that numerous modifications may be made while retaining the teachings of the present invention. For example, in another embodiment, a light reflection structure is formed on the rear surface 5B of the second face cover 5, but the first face cover 4 is not equipped with the light reflection structure. Due to this design, the interactive control device 1 can still recognize the first face cover 4 or the second face cover 5.

In the above embodiment, the interactive control device 1 comprises the optical sensing module 6 in the housing 2, the first face cover 4 is equipped with the light reflection structure 46, and the second face cover 5 is not equipped with the light reflection structure. Due to this design, the purpose of recognizing the first face cover 4 or the second face cover 5 can be achieved. In other words, this design is similar to the computer coding method. For example, if the receiver portion 62 receives the light beam from the transmitter portion 61, a sensing signal with the logic value "1" is generated. Whereas, if the receiver portion 62 does not receive the light beam from the transmitter portion 61 or the received amount of the light beam is lower than a threshold amount, the sensing signal with the logic value "0" is generated. According to the logic value "1" or "0" of the sensing signal, the interactive control device 1 can recognize that the face cover placed on the housing 2 is the first face cover 4 or the second face cover 5.

In case that there are more replaceable face covers, the interactive control device 1 is equipped with more optical sensing modules. Each of the face covers is selectively equipped with the light reflection structure or not equipped with the light reflection structure at the position corresponding to the related optical sensing module. Due to this design, the purpose of recognizing the face cover on the housing can also be achieved.

Figure 8:
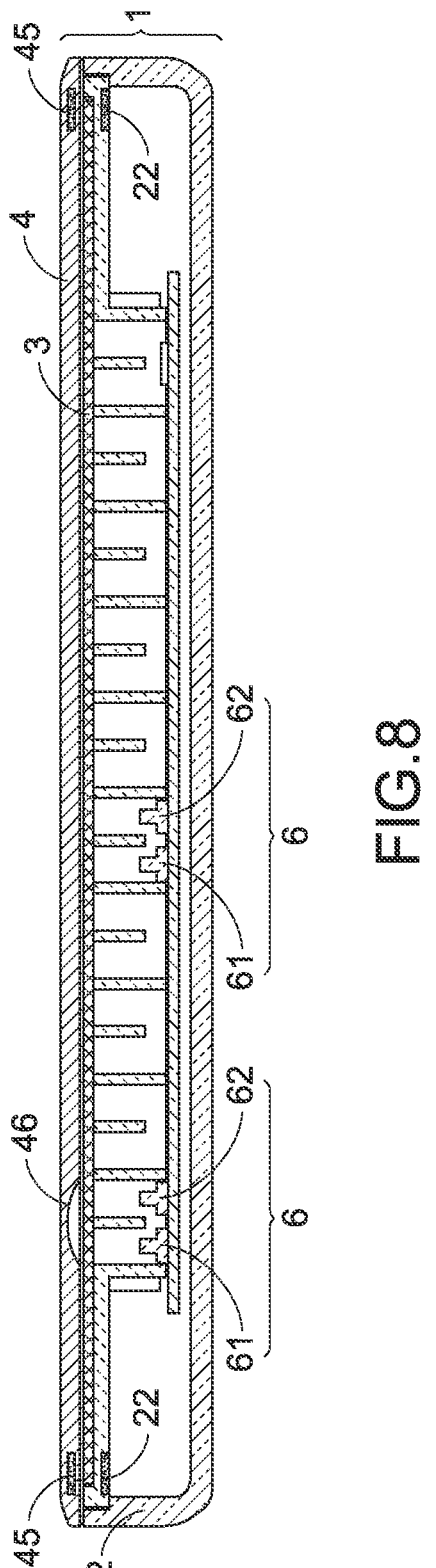
FIG. 8 is a schematic cross-sectional view illustrating a variant example of the interactive control device shown in FIG. 1, in which the interactive control device is equipped with plural optical sensing modules.
Figure 9:
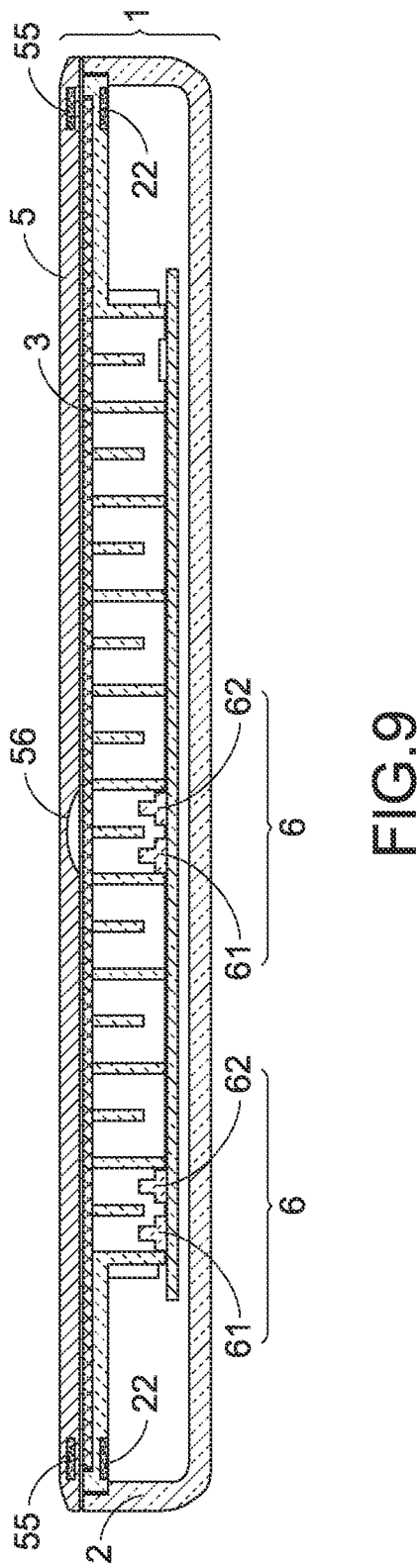
FIG. 9 is a schematic cross-sectional view illustrating a variant example of the interactive control device shown in FIG. 4, in which the interactive control device is equipped with plural optical sensing modules.

FIG. 8 is a schematic cross-sectional view illustrating a variant example of the interactive control device shown in FIG. 1, in which the interactive control device is equipped with plural optical sensing modules. FIG. 9 is a schematic cross-sectional view illustrating a variant example of the interactive control device shown in FIG. 4, in which the interactive control device is equipped with plural optical sensing modules.

Please refer to FIGS. 8 and 9. In this embodiment, the interactive control device 1 further comprises two optical sensing modules 6A and 6B, which are disposed within the housing 2. The first face cover 4 is equipped with the light reflection structure 46 at the position corresponding to the first optical sensing module 6A, and the first face cover 4 is not equipped with the light reflection structure at the position corresponding to the second optical sensing module 6B. The second face cover 5 is not equipped with the light reflection structure at the position corresponding to the first optical sensing module 6A, and the second face cover 5 is equipped with the light reflection structure 56 at the position corresponding to the second optical sensing module 6B. Consequently, as shown in FIG. 8, when the first face cover 4 is placed on the housing 2, a sensing signal with the logic value "10" is generated according to the judging results of the optical sensing modules 6A and 6B. Similarly, as shown in FIG. 9, when the second face cover 5 is placed on the housing 2, a sensing signal with the logic value "01" is generated according to the judging results of the optical sensing modules 6A and 6B. According to the logic value "10" or "01" of the sensing signal, the interactive control device 1 can recognize that the face cover placed on the housing 2 is the first face cover 4 or the second face cover 5.

Of course, the above concepts can be expanded. For example, in case that the interactive control device 1 comprises two optical sensing modules, the interactive control device 1 can recognize that the face cover placed on the housing 2 is one of four different face covers. Similarly, in case that the interactive control device 1 comprises three optical sensing modules, the interactive control device 1 can recognize that the face cover placed on the housing 2 is one of eight different face covers.

Figures 10, 11:
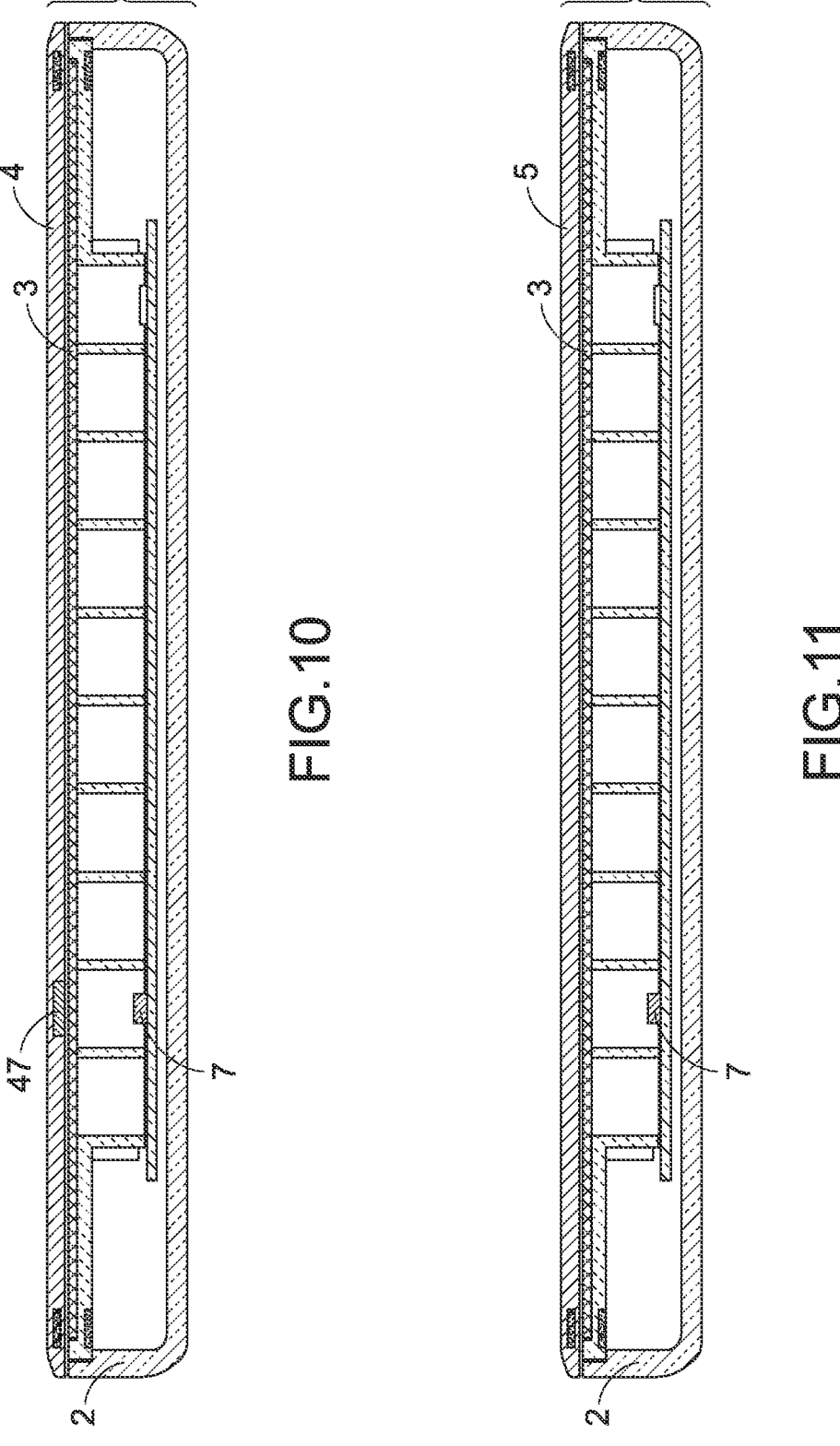
FIG. 10 is a schematic cross-sectional view illustrating a variant example of the interactive control device shown in FIG. 1, in which the interactive control device is equipped with a magnetic sensor.
FIG. 11 is a schematic cross-sectional view illustrating a variant example of the interactive control device shown in FIG. 4, in which the interactive control device is equipped with a magnetic sensor.

In some other embodiments, the sensing element of the interactive control device 1 recognizes the face cover by using a magnetic sensing method. FIG. 10 is a schematic cross-sectional view illustrating a variant example of the interactive control device shown in FIG. 1, in which the interactive control device is equipped with a magnetic sensor. FIG. 11 is a schematic cross-sectional view illustrating a variant example of the interactive control device shown in FIG. 4, in which the interactive control device is equipped with a magnetic sensor.

Please refer to FIGS. 10 and 11. In an embodiment, the interactive control device 1 further comprises a magnetic sensor 7. The magnetic sensor 7 is disposed within the housing 2. Correspondingly, a magnet 47 is formed on the first face cover 4. The magnet 47 and the magnetic sensor 7 are arranged in a position relationship in the vertical direction. For example, the magnet 47 is formed on the first face cover 4 are aligned with each other in the vertical direction. Alternatively, the magnet 47 is located at the position within the effective sensing range of the magnetic sensor 7. On the contrary, the second face cover 5 is not equipped with a magnet or any other magnetic field generation element at the position corresponding to the magnetic sensor 7. According to the result of judging whether the magnetic sensor 7 detects the magnet 47, the interactive control device 1 can recognize that the face cover placed on the housing 2 is the first face cover 4 or the second face cover 5.

It is noted that numerous modifications may be made while retaining the teachings of the present invention. For example, in another embodiment, a magnet is formed on the second face cover 5 at the position corresponding to the magnetic sensor 7, but the first face cover 4 is not equipped with the magnet. Due to this design, the interactive control device 1 can still recognize the first face cover 4 or the second face cover 5.

The principles of the magnetic sensing method are similar to the abovementioned optical sensing method. In other words, this design is similar to the computer coding method. For example, if the magnetic sensor 7 detects the magnet on the face cover, a sensing signal with the logic value "1" is generated. Whereas, if the magnetic sensor 7 does not detects the magnet on the face cover, the sensing signal with the logic value "0" is generated.

In case that there are more replaceable face covers, the interactive control device 1 is equipped with more magnetic sensors 7. Each of the face covers is selectively equipped with the magnet or not equipped with the magnet at the position corresponding to the related magnetic sensor. Due to this design, the purpose of recognizing the face cover on the housing can also be achieved.

Figure 12:
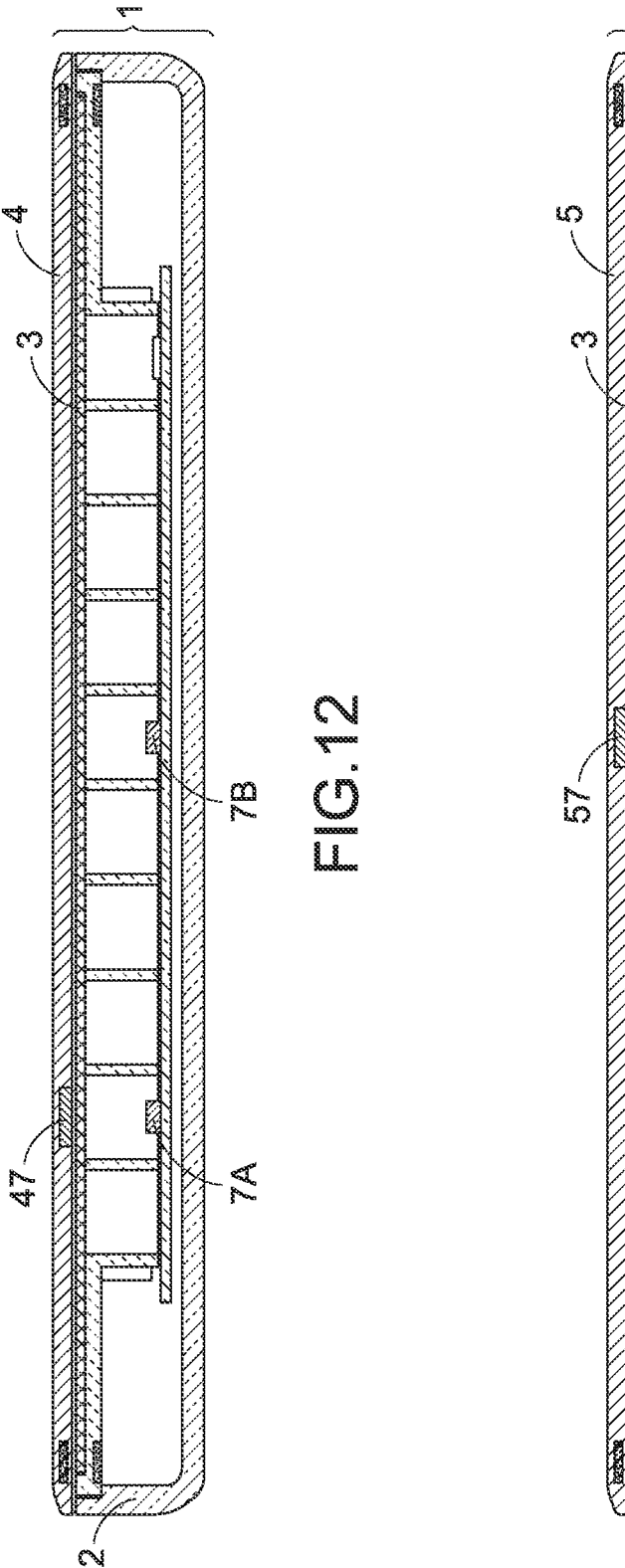
FIG. 12 is a schematic cross-sectional view illustrating a variant example of the interactive control device shown in FIG. 1, in which the interactive control device is equipped with plural magnetic sensors.
Figure 13:
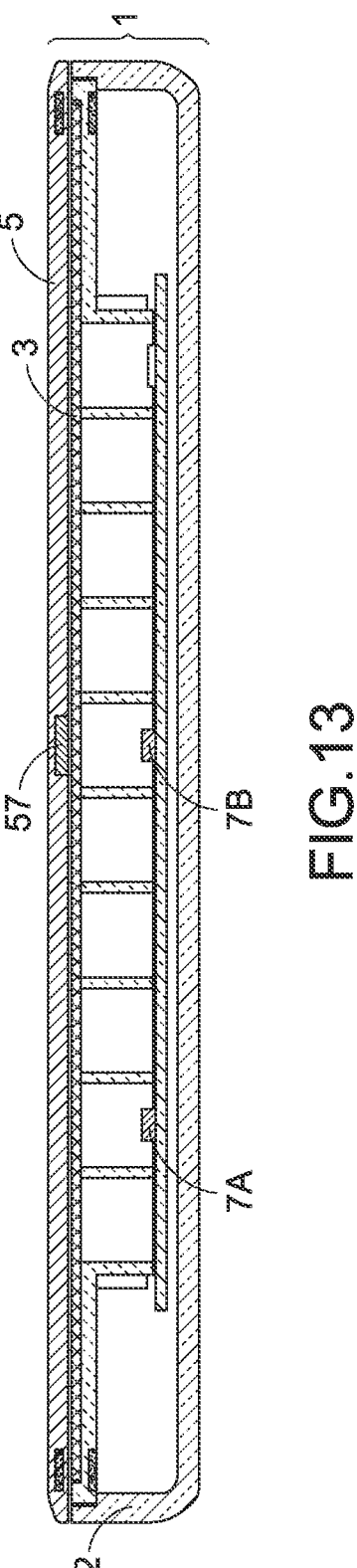
FIG. 13 is a schematic cross-sectional view illustrating a variant example of the interactive control device shown in FIG. 4, in which the interactive control device is equipped with plural magnetic sensors.

FIG. 12 is a schematic cross-sectional view illustrating a variant example of the interactive control device shown in FIG. 1, in which the interactive control device is equipped with plural magnetic sensors. FIG. 13 is a schematic cross-sectional view illustrating a variant example of the interactive control device shown in FIG. 4, in which the interactive control device is equipped with plural magnetic sensors.

Please refer to FIGS. 12 and 13. In this embodiment, the interactive control device 1 further comprises two magnetic sensors 7A and 7B, which are disposed within the housing 2. The first face cover 4 is equipped with the magnet 47 at the position corresponding to the first magnetic sensor 7A, and the first face cover 4 is not equipped with the magnet at the position corresponding to the second magnetic sensor 7B. The second face cover 5 is not equipped with the magnet at the position corresponding to the first magnetic sensor 7A, and the second face cover 5 is equipped with the magnet 57 at the position corresponding to the second magnetic sensor 7B. Consequently, as shown in FIG. 12, when the first face cover 4 is placed on the housing 2, a sensing signal with the logic value "10" is generated according to the judging results of the magnetic sensors 7A and 7B. Similarly, as shown in FIG. 13, when the second face cover 5 is placed on the housing 2, a sensing signal with the logic value "01" is generated according to the judging results of the magnetic sensors 7A and 7B. According to the logic value "10" or "01" of the sensing signal, the interactive control device 1 can recognize that the face cover placed on the housing 2 is the first face cover 4 or the second face cover 5.

Of course, the above concepts can be expanded. For example, in case that the interactive control device 1 comprises two magnetic sensors, the interactive control device 1 can recognize that the face cover placed on the housing 2 is one of four different face covers. Similarly, in case that the interactive control device 1 comprises three magnetic sensors, the interactive control device 1 can recognize that the face cover placed on the housing 2 is one of eight different face covers.

In a variant example, a triggering switch (not shown) is installed on the housing 2 to recognize the first face cover 4 or the second face cover 5. For example, the triggering switch is a membrane switch, or the triggering switch comprises two metal contacts. Correspondingly, the first face cover 4 is equipped with a contacting point (e.g., a raised structure) at the position corresponding to the membrane switch or the two metal contacts. On the contrary, the second face cover 5 is not equipped with the contacting point at the position corresponding to the membrane switch or the two metal contacts. Consequently, when the first face cover 4 is placed on the housing 2, the membrane switch is pressed by the contacting point and turned on, or the two metal contacts are electrically connected with each other through the contacting point. When the second face cover 5 is placed on the housing 2, the membrane switch is not turned on, or the two metal contacts are not electrically connected with each other. Due to the above design, the interactive control device 1 can recognize that the face cover installed on the housing 2 is the first face cover 4 or the second face cover 5.

In case that there are more replaceable face covers, the interactive control device 1 is equipped with more membrane switches or more metal contacts. Similarly, the principles of the computer coding method are adopted. The distribution arrangements of the touching points on different face covers are different. Due to this design, the interactive control device 1 can recognize the face cover on the housing 2.

In a variant example, a wireless sensing method is used to recognize the first face cover 4 or the second face cover 5. For example, a near-field communication (NFC) sensor is disposed within the housing 2. In addition, a unique NFC tag corresponding to the near-field communication (NFC) sensor is respectively formed on the first face cover 4 and the second face cover 5. Consequently, the NFC sensor can recognize that the face cover installed on the housing 2 is the first face cover 4 or the second face cover 5.

In the first embodiment, the user may select the desired face cover of the interactive control device 1 in order to execute a corresponding application program or implement a corresponding operation. In some other embodiments, a single face cover of the interactive control device can be used for performing the operations with both of the left and right hands.

Figure 14:
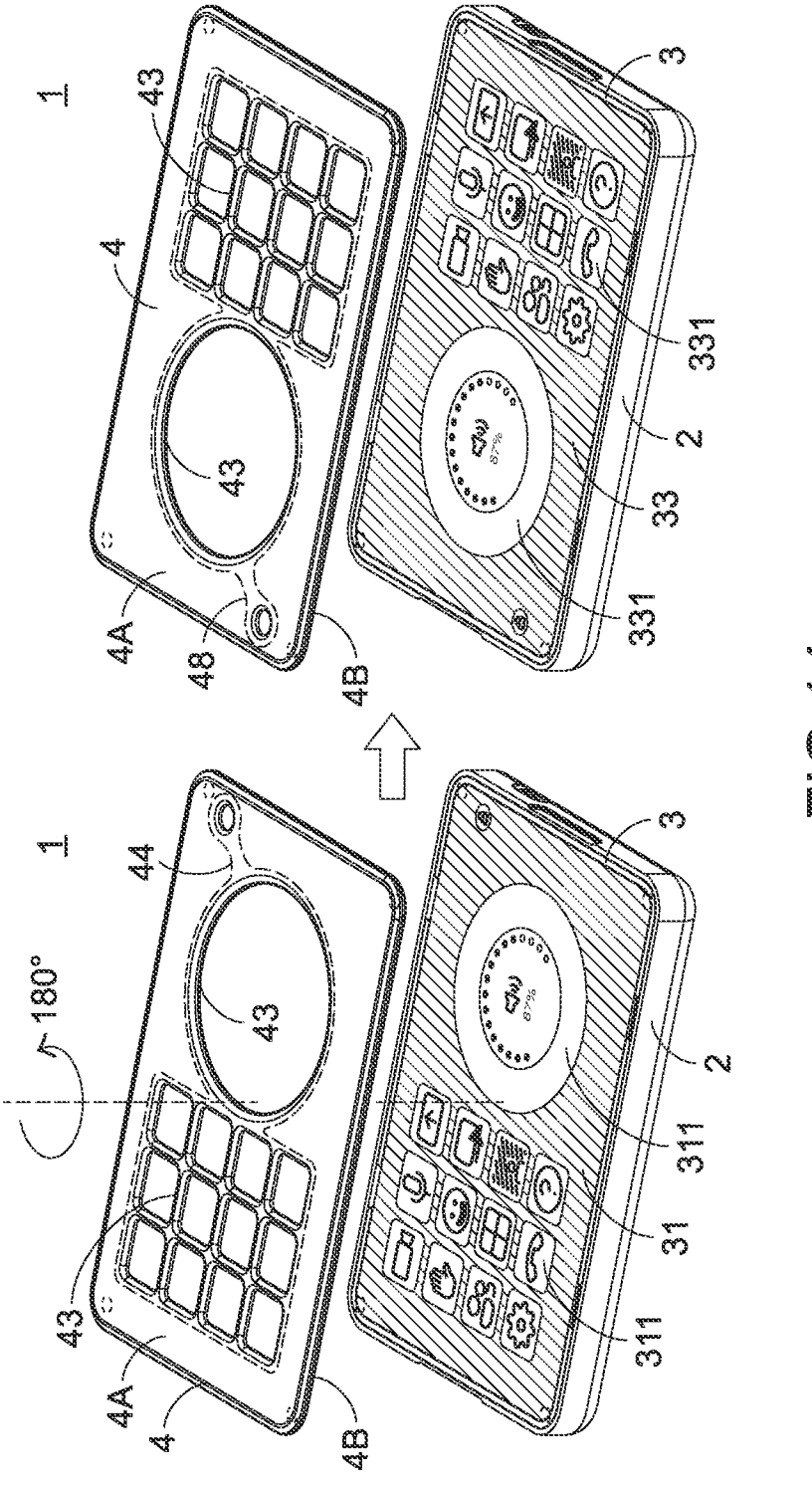
FIG. 14 is a schematic perspective and exploded view illustrating an interactive control device according to a second embodiment of the present invention.

FIG. 14 is a schematic perspective and exploded view illustrating an interactive control device according to a second embodiment of the present invention. The constituents and operations of the interactive control device 1 of this embodiment are similar to those of the interactive control device 1 of the first embodiment. In comparison with the first embodiment, the interactive control device 1 of the second embodiment is equipped with a single face cover. For example, the first face cover 4 of the first embodiment is suitably used as the face cover of the second embodiment.

In the second embodiment, the interactive control device 1 comprises a first face cover 4. The first face cover 4 has a front surface 4A and a rear surface 4B. In the left part of FIG. 14, when the user faces the front surface 4A of the first face cover 4, the plural hollow parts 43 formed in the front surface 4A are arranged in forming a first hollow configuration 44. After the first face cover 4 is rotated by a specified angle (e.g., 180 degrees), the user still faces the front surface 4A of the first face cover 4. That is, the usage scenario shown in the left part of FIG. 14 is changed to the usage scenario shown in the right part of FIG. 14. In the right part of FIG. 14, when the user faces the front surface 4A of the first face cover 4, the plural hollow parts 43 formed in the front surface 4A of the first face cover 4 are arranged in forming a second hollow configuration 48.

Please refer to FIG. 14 again. Through the plural hollow parts 43 formed in the first face cover 4, the user can perform various types of operations (e.g., tapping, pressing, sliding or rotating operations). After the first face cover 4 is rotated and the first face cover 4 is correctly assembled with the housing 2 and placed over the touch display panel 3, another operating structure is provided to adapt to different users, or the user can use the left hand or the right hand to perform the operations. Consequently, the expandability of operating the product is enhanced.

In the first embodiment, the interactive control device 1 recognizes whether the face cover installed on the housing 2 is the first face cover 4 or the second face cover 5 through the installation of a sensing element (e.g., the optical sensing module or the magnetic sensor), a wireless sensing method or an electric connection method. Consequently, the touch display panel 3 outputs the first screen 31 or the second screen 32. Similarly, in the second embodiment, the interactive control device 1 recognizes whether the face cover installed on the housing 2 is the first face cover 4 before rotated (i.e., in the usage scenario shown in the left part of FIG. 14) or the first face cover 4 after rotated (i.e., in the usage scenario shown in the right part of FIG. 14) through the installation of a sensing element (e.g., the optical sensing module or the magnetic sensor), a wireless sensing method or an electric connection method. Consequently, as shown in FIG. 14, the touch display panel 3 outputs a first screen 31 or a second screen 33. When the second screen 33 is outputted from the touch display panel 3, the second screen 33 is constituted by plural sub-screens 331 corresponding to the second hollow configuration 48.

In an embodiment, the interactive control device 1 recognizes whether the face cover installed on the housing 2 is the first face cover 4 before rotated or the first face cover 4 after rotated by using an optical sensing method. The mechanism for performing the optical sensing method may be referred to the mechanism of FIG. 6. That is, an optical sensing module 6 is disposed within the housing 2, and a light reflection structure 46 is formed on the rear surface 4B of the first face cover 4. In case that the first face cover 4 is not rotated, the light reflection structure 46 faces the optical sensing module 6, and the light reflection structure 46 and the optical sensing module 6 are aligned with each other in the vertical direction. When the first face cover 4 is placed on the housing 2, the light beam from the transmitter portion 61 is reflected by the light reflection structure 46 on the rear surface 4B of the first face cover 4 and transmitted to the receiver portion 62. Consequently, the interactive control device 1 recognizes that the face cover installed on the housing 2 is the first face cover 4 before rotated. After the first face cover 4 is rotated by the specified angle (e.g., 180 degrees), the light reflection structure 46 does not face the optical sensing module 6, and the light reflection structure 46 and the optical sensing module 6 are not aligned with each other in the vertical direction. In case that the first face cover 4 after rotated (i.e., in the usage scenario shown in the right part of FIG. 14) is placed on the housing 2, the light beam from the transmitter portion 61 cannot be reflected by the light reflection structure 46 on the rear surface 4B of the first face cover 4 and transmitted to the receiver portion 62. Consequently, the interactive control device 1 recognizes that the face cover installed on the housing 2 is the first face cover 4 after rotated.

In an embodiment, the interactive control device 1 recognizes whether the face cover installed on the housing 2 is the first face cover 4 before rotated or the first face cover 4 after rotated by using a magnetic sensing method. The mechanism for performing the magnetic sensing method may be referred to the mechanism of FIG. 10. That is, a magnetic sensor 7 is disposed within the housing 2, and a magnet 47 is formed on the first face cover 4. In case that the first face cover 4 is not rotated, the magnet 47 and the magnetic sensor 7 are aligned with each other in the vertical direction. When the first face cover 4 is placed on the housing 2, the magnetic sensor 7 detects the magnet 47. Consequently, the interactive control device 1 recognizes that the face cover installed on the housing 2 is the first face cover 4 before rotated. After the first face cover 4 is rotated by the specified angle (e.g., 180 degrees), the magnet 47 and the magnetic sensor 7 are not aligned with each other in the vertical direction or the magnet 46 is beyond the effective sensing distance of the magnetic sensor 7. In case that the first face cover 4 after rotated (i.e., in the usage scenario shown in the right part of FIG. 14) is placed on the housing 2, the magnetic sensor 7 cannot detect the magnet 47. Consequently, the interactive control device 1 recognizes that the face cover installed on the housing 2 is the first face cover 4 after rotated.

In the second embodiment of the interactive control device 1, the expandability of operating the product is enhanced through the action of rotating the face cover. In some other embodiments, the expandability of operating the product is enhanced through the action of flipping the face cover.

Figure 15:
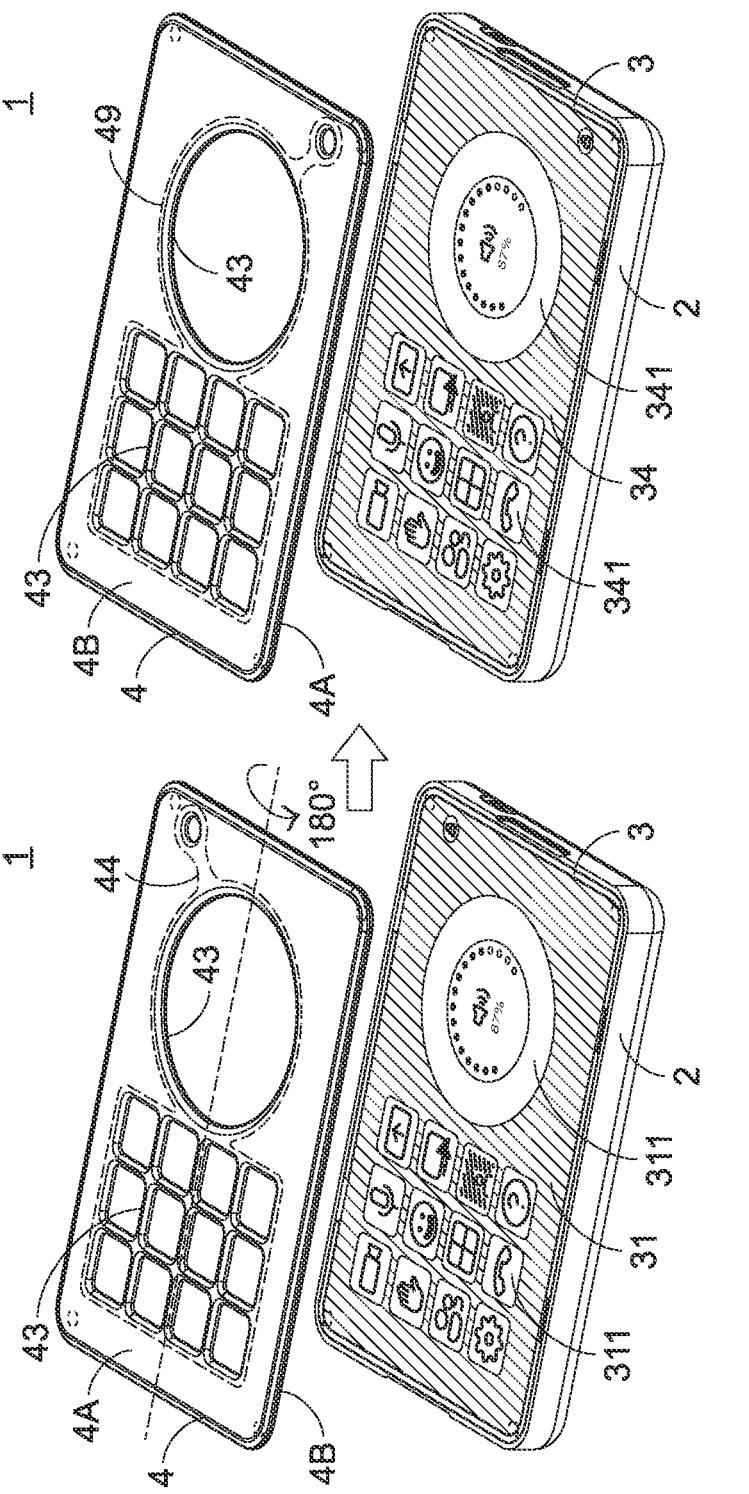
FIG. 15 is a schematic perspective and exploded view illustrating an interactive control device according to a third embodiment of the present invention.

FIG. 15 is a schematic perspective and exploded view illustrating an interactive control device according to a third embodiment of the present invention. The constituents and operations of the interactive control device 1 of this embodiment are similar to those of the interactive control device 1 of the first embodiment. In comparison with the first embodiment, the interactive control device 1 of the third embodiment is equipped with a single face cover. For example, the first face cover 4 of the first embodiment is suitably used as the face cover of the third embodiment.

In the third embodiment, the interactive control device 1 comprises a first face cover 4. The first face cover 4 has a front surface 4A and a rear surface 4B. In the left part of FIG. 15, when the user faces the front surface 4A of the first face cover 4, the plural hollow parts 43 formed in the front surface 4A are arranged in forming a first hollow configuration 44. After the first face cover 4 is flipped at a specified angle (e.g., 180 degrees), the user faces the rear surface 4B of the first face cover 4. That is, the usage scenario shown in the left part of FIG. 15 is changed to the usage scenario shown in the right part of FIG. 15. In the right part of FIG. 15, when the user faces the rear surface 4B of the first face cover 4, the plural hollow parts 43 formed in the rear surface 4B of the first face cover 4 are arranged in forming a second hollow configuration 49.

Please refer to FIG. 15 again. Through the plural hollow parts 43 formed in the first face cover 4, the user can perform various types of operations (e.g., tapping, pressing, sliding or rotating operations). After the first face cover 4 is flipped and the first face cover 4 is correctly assembled with the housing 2 and placed over the touch display panel 3, another operating structure is provided to adapt the operating orientation or usual practice of the user. Consequently, the expandability of operating the product is enhanced.

Similarly, in the third embodiment, the interactive control device 1 recognizes whether the face cover installed on the housing 2 is the first face cover 4 before flipped (i.e., in the usage scenario shown in the left part of FIG. 15) or the first face cover 4 after flipped (i.e., in the usage scenario shown in the right part of FIG. 15) through the installation of a sensing element (e.g., the optical sensing module or the magnetic sensor), a wireless sensing method or an electric connection method. Consequently, as shown in FIG. 15, the touch display panel 3 outputs a first screen 31 or a second screen 34. When the second screen 34 is outputted from the touch display panel 3, the second screen 34 is constituted by plural sub-screens 341 corresponding to the second hollow configuration 49.

In an embodiment, the interactive control device 1 recognizes whether the face cover installed on the housing 2 is the first face cover 4 before flipped or the first face cover 4 after flipped by using an optical sensing method. The mechanism for performing the optical sensing method may be referred to the mechanism of FIG. 6. That is, an optical sensing module 6 is disposed within the housing 2, and a light reflection structure 46 is formed on the rear surface 4B of the first face cover 4. In case that the first face cover 4 is not flipped, the light reflection structure 46 faces the optical sensing module 6, and the light reflection structure 46 and the optical sensing module 6 are aligned with each other in the vertical direction. When the first face cover 4 is placed on the housing 2, the light beam from the transmitter portion 61 is reflected by the light reflection structure 46 on the rear surface 4B of the first face cover 4 and transmitted to the receiver portion 62. Consequently, the interactive control device 1 recognizes that the face cover installed on the housing 2 is the first face cover 4 before flipped. After the first face cover 4 is flipped at the specified angle (e.g., 180 degrees), the light reflection structure 46 does not face the optical sensing module 6, and the light reflection structure 46 and the optical sensing module 6 are not aligned with each other in the vertical direction. In case that the first face cover 4 after flipped (i.e., in the usage scenario shown in the right part of FIG. 15) is placed on the housing 2, the light beam from the transmitter portion 61 cannot be reflected by the light reflection structure 46 on the rear surface 4B of the first face cover 4 and transmitted to the receiver portion 62. Consequently, the interactive control device 1 recognizes that the face cover installed on the housing 2 is the first face cover 4 after flipped.

In an embodiment, the interactive control device 1 recognizes whether the face cover installed on the housing 2 is the first face cover 4 before flipped or the first face cover 4 after flipped by using a magnetic sensing method. The mechanism for performing the magnetic sensing method may be referred to the mechanism of FIG. 10. That is, a magnetic sensor 7 is disposed within the housing 2, and a magnet 47 is formed on the first face cover 4. The magnet 47 and the magnetic sensor 7 are aligned with each other in the vertical direction. In case that the first face cover 4 is not flipped, the magnet 47 and the magnetic sensor 7 are aligned with each other in the vertical direction. When the first face cover 4 is placed on the housing 2, the magnetic sensor 7 detects the magnet 47. Consequently, the interactive control device 1 recognizes that the face cover installed on the housing 2 is the first face cover 4 before flipped. After the first face cover 4 is flipped at the specified angle (e.g., 180 degrees), the magnet 47 and the magnetic sensor 7 are not aligned with each other in the vertical direction or the magnet 46 is beyond the effective sensing distance of the magnetic sensor 7. In case that the first face cover 4 after flipped (i.e., in the usage scenario shown in the right part of FIG. 15) is placed on the housing 2, the magnetic sensor 7 cannot detect the magnet 47. Consequently, the interactive control device 1 recognizes that the face cover installed on the housing 2 is the first face cover 4 after flipped.

From the above descriptions, the present invention provides the interactive control device. The face cover of the interactive control device is replaceable. Consequently, the original face cover can be replaced with a desired face cover by the user according to the user's requirements. In addition, the touch display panel outputs the corresponding screen according to the hollow configuration of the corresponding face cover. In case that the user wants to replace the original face cover with a new face cover, the original face cover is detached from the housing. Meanwhile, the touch display panel enters a locking state, and the touch input function is disabled. After the interactive control device recognizes that the new face cover is installed on the housing or the original face cover is rotated or flipped, the touch input function is restored. Furthermore, when the interactive control device starts to recognize the new face cover, the interactive control device visual or auditory prompt message to the user. For example, a welcome image or animation is displayed on touch display panel, or a specified sound effect is generated through a sound output device (e.g., a speaker or a buzzer). The prompt message can help the user know that the face cover has been correctly placed on the housing. In addition, the interactive control device will have enough time to implement recognition or calculation.

Consequently, the touch display panel can output the screen corresponding to the newly installed face cover.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. An interactive control device, comprising:
   a housing;
   a touch display panel disposed within the housing; and
   a first face cover having a first hollow configuration, wherein when the first face cover is placed over the touch display panel, a first screen is displayed on the touch display panel, and the first screen is exposed through the first hollow configuration; and
   a second face cover having a second hollow configuration, which is different from the first hollow configuration, wherein when the second face cover is placed over the touch display panel, a second screen is displayed on the touch display panel, and the second screen is exposed through the second hollow configuration,
   wherein the interactive control device further comprises a memory, and a first boundary information about the first hollow configuration and a second boundary information about the second hollow configuration are stored in the memory, wherein the touch display panel outputs the first screen according to the first boundary information, and the touch display panel outputs the second screen according to the second boundary information.

2. The interactive control device according to claim 1, wherein the first face cover comprises plural hollow parts, and the plural hollow parts are arranged in forming the first hollow configuration, wherein the first screen comprises plural sub-screens, and shapes and sizes of the plural sub-screens of the first screen match the shapes and sizes of the plural hollow parts of the first face cover, wherein the second face cover comprises plural hollow parts, and the plural hollow parts are arranged in forming the second hollow configuration, wherein the second screen comprises plural sub-screens, and shapes and sizes of the plural sub-screens of the second screen match the shapes and sizes of the plural hollow parts of the second face cover.

3. The interactive control device according to claim 1, wherein the interactive control device further comprises a sensing element, and the sensing element recognizes the first face cover or the second face cover.

4. The interactive control device according to claim 3, wherein the sensing element comprises an optical sensing module, wherein the optical sensing module is disposed within the housing, and the optical sensing module comprises a transmitter portion and a receiver portion.

5. The interactive control device according to claim 4, wherein the first face cover has a front surface and a rear surface, and the second face cover has a front surface and a rear surface, wherein a light reflection structure is formed on the rear surface of the first face cover or the rear surface of the second face cover and faces the optical sensing module, and a light beam from the transmitter portion is reflected by the light reflection structure and transmitted to the receiver portion.

6. The interactive control device according to claim 3, wherein the sensing element comprises a magnetic sensor, and the magnetic sensor is disposed within the housing, wherein a magnet is installed on the first face cover or the second face cover, and the magnetic sensor and the magnet are aligned with each other in a vertical direction.

* * * * *